(12) United States Patent
LaFave

(10) Patent No.: US 7,853,454 B2
(45) Date of Patent: *Dec. 14, 2010

(54) METHOD OF PRODUCING A PAINT FILM PART

(75) Inventor: Robert J. LaFave, Birch Run, MI (US)

(73) Assignee: Laminate Products, Inc., Kingston, MI (US)

( * ) Notice: Subject to any disclaimer, the term of this patent is extended or adjusted under 35 U.S.C. 154(b) by 1284 days.

This patent is subject to a terminal disclaimer.

(21) Appl. No.: 11/293,003

(22) Filed: Dec. 2, 2005

(65) Prior Publication Data

US 2006/0122860 A1    Jun. 8, 2006

Related U.S. Application Data

(60) Provisional application No. 60/632,729, filed on Dec. 2, 2004.

(51) Int. Cl.
*G06Q 10/00* (2006.01)

(52) U.S. Cl. .................. 705/1.1; 428/31; 428/421; 428/521; 428/522; 428/523

(58) Field of Classification Search .............. 705/1.1; 428/31, 421, 521, 522, 523
See application file for complete search history.

(56) References Cited

U.S. PATENT DOCUMENTS

| | | | |
|---|---|---|---|
| 3,640,791 A | 2/1972 | Rosenheim |
| 3,829,343 A | 8/1974 | Remmert |
| 3,919,379 A | 11/1975 | Smarook |
| 3,928,710 A | 12/1975 | Arnold et al. |
| 4,072,779 A | 2/1978 | Knox et al. |
| 4,101,698 A | 7/1978 | Dunning et al. |
| 4,263,077 A | 4/1981 | Rampelberg |
| 4,291,085 A | 9/1981 | Ito et al. |
| 4,326,005 A | 4/1982 | Reed et al. |
| 4,329,196 A | 5/1982 | Rawlinson |
| 4,330,352 A | 5/1982 | Grimes et al. |
| 4,333,786 A | 6/1982 | Civardi et al. |

(Continued)

FOREIGN PATENT DOCUMENTS

EP    0159942 A2    10/1985

(Continued)

OTHER PUBLICATIONS

EIC search, Mar. 6, 2010 and documentation, entire document.*

(Continued)

*Primary Examiner*—Janice A. Mooneyham
*Assistant Examiner*—Michael J Fisher
(74) *Attorney, Agent, or Firm*—Preston Smirman; Smirman IP Law, PLLC

(57) ABSTRACT

Methods for producing decorative laminate composites are described. The method includes the owner of intellectual property covering the use and manufacture of paint film technology selectively licensing the technology to various automotive component suppliers and manufacturers. In this manner, the total number of suppliers in the supply chain can be either reduced and/or more carefully controlled, thus leading to increased levels of finished component quality control. By way of a non-limiting example, a single licensee/supplier can produce the finished component.

21 Claims, 1 Drawing Sheet

U.S. PATENT DOCUMENTS

| | | | |
|---|---|---|---|
| 4,392,905 A | 7/1983 | Boyd et al. |
| 4,421,816 A | 12/1983 | Arnold |
| 4,421,839 A | 12/1983 | Takiguchi et al. |
| 4,451,522 A | 5/1984 | de Vroom |
| 4,490,427 A | 12/1984 | Grant et al. |
| 4,497,851 A | 2/1985 | de Vroom |
| 4,515,649 A | 5/1985 | Nussbaum |
| 4,536,546 A | 8/1985 | Briggs |
| 4,637,904 A | 1/1987 | Rounds |
| 4,773,957 A | 9/1988 | Briggs |
| 4,810,540 A | 3/1989 | Ellison et al. |
| 4,818,589 A | 4/1989 | Johnson et al. |
| 4,824,506 A | 4/1989 | Hoerner et al. |
| 4,832,991 A | 5/1989 | Hayward et al. |
| 4,900,611 A | 2/1990 | Carroll, Jr. |
| 4,902,557 A | 2/1990 | Rohrbacher |
| 4,906,507 A | 3/1990 | Grynaeus et al. |
| 4,913,760 A | 4/1990 | Benson et al. |
| 4,913,970 A | 4/1990 | Hayward et al. |
| 4,918,800 A | 4/1990 | Reafler |
| 4,921,556 A | 5/1990 | Hakiel et al. |
| 4,921,755 A | 5/1990 | Carroll, Jr. et al. |
| 4,931,324 A | 6/1990 | Ellison et al. |
| 4,933,237 A | 6/1990 | Krenceski et al. |
| 4,943,680 A | 7/1990 | Ellison et al. |
| 4,976,896 A | 12/1990 | Short et al. |
| 5,026,448 A | 6/1991 | Reafler et al. |
| 5,034,077 A | 7/1991 | Pata |
| 5,034,269 A | 7/1991 | Wheeler |
| 5,034,275 A | 7/1991 | Pearson et al. |
| 5,100,728 A | 3/1992 | Plamthottam et al. |
| 5,114,514 A | 5/1992 | Landis |
| 5,114,789 A | 5/1992 | Reafler |
| 5,118,372 A | 6/1992 | Spahn |
| 5,125,994 A | 6/1992 | Harasta et al. |
| 5,132,148 A | 7/1992 | Reafler |
| 5,165,976 A | 11/1992 | Newing et al. |
| 5,192,609 A | 3/1993 | Carroll, Jr. |
| 5,203,941 A | 4/1993 | Spain et al. |
| 5,215,811 A | 6/1993 | Reafler et al. |
| 5,215,826 A | 6/1993 | Shimanski et al. |
| 5,268,215 A | 12/1993 | Krenceski et al. |
| 5,286,528 A | 2/1994 | Reafler |
| 5,294,669 A | 3/1994 | Kawashima et al. |
| 5,318,815 A | 6/1994 | Newing et al. |
| 5,456,976 A | 10/1995 | LaMarca, II et al. |
| 5,518,786 A | 5/1996 | Johnson et al. |
| 5,593,759 A | 1/1997 | Vargas et al. |
| 5,599,608 A | 2/1997 | Yamamoto et al. |
| 5,707,697 A | 1/1998 | Spain et al. |
| 5,725,712 A | 3/1998 | Spain et al. |
| 5,747,177 A | 5/1998 | Torimoto et al. |
| 5,750,234 A | 5/1998 | Johnson et al. |
| 5,759,477 A | 6/1998 | Yamamoto |
| 5,783,287 A | 7/1998 | Yamamoto et al. |
| 5,817,402 A | 10/1998 | Miyake et al. |
| 5,840,783 A | 11/1998 | Momchilovich et al. |
| 5,895,624 A | 4/1999 | Reece et al. |
| 5,916,643 A | 6/1999 | Spain et al. |
| 5,919,537 A | 7/1999 | Niazy |
| 5,968,657 A | 10/1999 | Scullin et al. |
| 6,045,744 A | 4/2000 | Kobayashi et al. |
| 6,083,335 A | 7/2000 | Scullin et al. |
| 6,103,328 A | 8/2000 | Niazy |
| 6,113,838 A | 9/2000 | Flynn et al. |
| 6,187,233 B1 | 2/2001 | Smith |
| 6,206,998 B1 | 3/2001 | Niazy |
| 6,284,183 B1 | 9/2001 | Roys et al. |
| 6,319,438 B1 | 11/2001 | Smith et al. |
| 6,399,193 B1 | 6/2002 | Ellison |
| 6,551,432 B1 | 4/2003 | Spain et al. |
| 6,696,117 B2 | 2/2004 | Dey et al. |
| 6,805,927 B2 | 10/2004 | Dey et al. |
| 6,805,959 B2 | 10/2004 | Dey et al. |
| 6,849,339 B2 | 2/2005 | Dey et al. |
| 2002/0009598 A1 | 1/2002 | LaFave et al. |
| 2002/0050665 A1 | 5/2002 | Roys et al. |
| 2003/0099789 A1 | 5/2003 | Dey et al. |
| 2003/0099790 A1 | 5/2003 | Dey et al. |
| 2003/0099840 A1 | 5/2003 | Dey et al. |
| 2003/0170460 A1 | 9/2003 | Sienkiewicz et al. |
| 2004/0033365 A1 | 2/2004 | Dey et al. |

FOREIGN PATENT DOCUMENTS

| | | |
|---|---|---|
| EP | 0230364 A2 | 7/1987 |
| EP | 0230364 B1 | 7/1987 |
| EP | 0230364 B2 | 7/1987 |
| EP | 0266107 A2 | 5/1988 |
| EP | 0266107 B2 | 5/1988 |
| EP | 0348310 A2 | 12/1989 |
| EP | 0348310 A3 | 12/1989 |
| EP | 0348310 B1 | 12/1989 |
| WO | WO 84/03473 | 9/1984 |
| WO | WO 86/01771 | 3/1986 |

OTHER PUBLICATIONS

Asahi Glass Company, Ltd.; "AFLEX ETFE Film, Ethylene Tetrafluoroethylene copolymer," No date.

Soliant; "Fluorex Exterior film laminates Processing Guide;" Aug. 20, 2002; pp. 1-27; United States.

Dupont; "Tedlar SP polyvinyl fluoride film;" "Laminating Guide;" No date; United States.

Dupont; "DuPont Teflon and Tefzel Films;" 2003; pp. 1-8.

Dupont; "Tedlar SP polyvinyl fluoride film;" Product and Properties Guide; 1996; United States.

Dupont; "DuPont Teflon and Tefzel Films;" Types LZ, CLZ, and CLZ-20; 2003.

John Peter; "Farewell to Paint Shops?" Automotive industries; Nov. 2002; pp. 20-21.

Matthew H. Naitove; "Trend-Setting Technologies Garner SPE Awards;" Automotive Innovation; Dec. 2002; pp. 50-54.

Patrick A. Toensmeier; "Automotive is Fertile Ground for Growth;" Modern Plastics; Nov. 2002; p. 41.

"Back to the Future Thirty-Second Annual Innovation Awards Program;" Nov. 18, 2002.

Rexam, Fluorex Paint Film Introduces a Full Spectrum of Solutions, Feb. 22, 1999.

Rexam, Fluorex Paint Film can be easily Incorporated into Existing Systems, Feb. 22, 1999.

Thomas M. Ellison, No-emission dry paint films, Chemtech, pp. 36-39, May 25, 1995.

Presentation to Rexam Coated Films and Papers, White-Space Growth Strategy for CFP: Paint Film, Jul. 7, 1999.

1999 Performance Scorecard—Draft (date unknown).

Email Corresondence from John H. Cupstid to T. Randy Fields; C. Jerry Patton regarding Thick sheet thermoforming article, Jul. 10, 2000.

Email Correspondence from John H. Cupstid to C. Jerry Patton; Bill R. Steele regarding Durakon: Large sheet thermoformer; Nov. 8, 2000.

Email Correspondence from John H. Cupstid to T. Randy Fields; C. Jerry Batton; Bill R. Steele regarding Plastic Innovations: Solvay + Tedlar, Nov. 13, 2000.

Rexam Performance Products Lancaster Project Sumary, Feb. 1996.

Joe Randazzo, Thermoforming Class A Bumper/Fascia, Guardian Automotive Technical Center (date unknown).

Lilli Manolis Sherman, Decorating With Formable Films, In Mold Deocrating, pp. 44-49, Jan. 2004.

Robert Leaversuch, Thermoformer is Reinvented Through Process Innovation, Jan. 2004.

Email Correspondence from John H. Cupstid to kestutis.sonta@gm.com; polybond@gte.net; Bill R. Steele, regarding Tech service guide, Jul. 19, 2002.

Fluorex Exterior Film Laminates Processing Guide, Rexam, Nov. 2, 1999.
Email Correspondence from John H. Cupstid to polybond@gte.net, regarding you may find this useful, Jan. 25, 2002.
Start with the Finish, (date unknown).
Email Correspondence from John H. Cupstid to polybond@gte.net, regarding Fluorex bright film bulletin, Feb. 18, 2002.
Thermoformable Bright Film for Automotive Trim, Rexam weatherable films, Jul. 2001.
Film-Coated TPO Bumpers can be Repaired and refinished (date unknown).
Email Correspondence from John H. Cupstid to polybond@gte.net, regarding National Society of Plstic Engineers, Jul. 25, 2001.
Email Correspondence from Jerry Patton to John Cupstid, regarding Meeting Notice: Supplier Paint Film Material Review for the Paint Film Team, Mar. 27, 2003.
Email Correspondence from Jerry Patton to Bill Steele; John Cupstid, regarding GM Cladding Commodity Team Update.
Development of "V8" now designated PA1, (date unknown).
Purchasing Requisition, Dec. 5, 1997.
Rexam Custom Purchase Order, Sep. 7, 1997.
Sales Order Form, Jan. 7, 1998.
Performance White on white TPO Color Critical document, (date unknown).
Purchasing Requisition, Jan. 28, 1998.
Rexam Interoffice Memo from Theresa Lamming to Mike Sclmanski, Scott Huffer & Mark Outlaw, regarding Various Huntsman Nylon/LLDPE coextreded sheets (XFC3-322-1228) submitted for DSC thermal history studies and crystallinity comparisons, Feb. 17, 1998.
Study of the Thermal Mechanical Properties of Mask Film, (date unknown).
Email Correspondence from Scott W. Huffer to Joe Smith, Kathy Batdorf, C Jerry Patton, John H. Cupstid, Bill R. Steele and Kenda R. Mccoy, regarding Premask Performance, May 10,1999.
Email Correspondence from Mark O Outlaw to Kathy Batdorf at RXCLANP1, regarding 1.7 mil Premask & Gray Mask: Conversatio with GTC, Jun. 24, 1999.
QPF Thermoforming Evaluation Report (Automation Pain Film Mask Variants), Aug. 11, 1999.
Correspondence from Mark O. Outlaw to Joseph Smith, regarding Avalon rocker program, Dec. 22, 1999.
Correspondence from Kenneth Rittenhouse to Mark Outlaw, regarding PVDF films, Feb. 23, 2000.
Technical Information Data Sheet, Feb. 10, 1986.
Joseph R. Flwsher, Jr., Polyether block amide: high-performance TPE, Modern Plastics, Sep. 1987.
Email Correspondence from John H. Cupstid to Kathy Batdorf, regarding Guardian, Jan. 15, 1999.
Email Correspondence from John H. Cupstid to Bill R. Steele, regarding Sample request:Guardian Industries, Feb. 1, 1999.
Email Correspondence from John H. Cupstid to Scott W. Huffer, regarding Guardian/Peninsula, Apr. 12, 1999.
Email Correspondence from John H. Cupstid to Kathy Batdorf regarding TPO, Bexloy, Hivalloy samples, May 6, 1999.
Email Correspondence from kreinecke@guardian.com to C. Jerry. Jatton, regarding quotes, Jun. 15, 2001.
Email Correspondence from John H. Cupstid to Jeff J. Bailey; C. Jerry Patton; Bill Re. Steele, regarding Color palette for he 2003 ½ CS/RS, Jun. 19, 2001.
Correspondence from Jeff J. Bailey to C. Jerry Patton; John H. Cupstid, regarding CS presentation for DCX, Jun. 28, 2001.
Email Correspondence from John H. Cupstid to Jeff J. Bailey; C. Jerry Patton, regarding got your voicemail, Jul. 3, 2001.
Email Correspondence from John H. Cupstid to Jeff J. Bailey, et al, regarding Costing exercise: Jamestown plastics on BSM, Sep. 7, 2001.
Cost Model Analysis Vacpres Process, Android Industries Guardian Industries, Containing summary, previous cost model, revised cost model, sensitivity analysis and dry paint film quotes, Oct. 27, 1998.
Email Correspondence from John H. Cupstid to Polybond>e.net, regarding no charge po: combo mask, Mar. 12, 2002.
Email Correspondence from John H. Cupstid to Robert LaFave, regarding No charge po: combo mask, Mar. 13, 2002.
Email Correspondence from John H. Cupstid to Polybond@gte.net, regarding samples from Jamestown, Jun. 3, 2002.
MEX Order and Special Instructions, 500lf, 2 mil Self-Wound LSR Mask Film, (date unknown).
Correspondence from Robert LaFave, regarding Guardian (KJ test material), Oct. 15, 2001.
Correspondence from G. Alan Sumrell to Jeff J. Bailey, regarding Thick Mask Experiment, Oct. 19, 2001.
Email Correspondence from Mark A Beard to John H. Cupstid; Jeff J. Bailey; G. Alan Sumrell, regarding Polybond Tedlar/Urethane mask combo, Jan. 15, 2002.
Email Correspondence from John H. Cupstid to Jeff J. Bailey; C. Jerry Patton, regarding Rexam sample over TPO for current running board evaluation, Jan. 22.
Email Correspondence from John H. Cupstid to polybond©gte.net; Jeff J. Bailey; C. Jerry Patton; Bill R. Steele, regarding GM370 film pricing, Jan. 29, 2002.
Email Correspondence from C. Jerry Patton to Bill R. Steele; Jeff J. Bailey; John H. Cupstid, regarding GM370 materials, Jan. 29, 2002.
Email Correspondence from John H. Cupstid to Jeff J. Bailey; C. Jerry Patton, regarding shipments to PolyBOND, Mar. 4, 2002.
Email Correspondence from Jeff F. Bailey to Robert Lafave, J. Cupstid; J. Patton, regarding combo mask, Apr. 19, 2002.
Email Correspondence from Jeff J. Bailey to C. Jerry Patton; John H. Cupstid, regarding combo mask, May 22, 2002.
Email Correspondence from Robert LaFave to Jeff Bailey, regarding V14 Combo Mask, Jun. 20, 2002.
Email Correspondence from Jeff J. Bailey to Brian Scoggins, et al, regarding Polybond Mask Credit, Jul. 16, 2002.
Email Correspondence from John H. Cupstid to C. Jerry Patton; Jeff J. Bailey, regarding Combo Mask, Oct. 8, 2002.
Correspondence from Bill Steele to Robert LaFave, regarding combo mask, Mar. 31, 2003.
Email Correspondence from John H. Cupstid to Jeff J. Bailey; Randy Fields; C. Jerry Patton, regarding Android, Jan. 4, 2001.
Correspondence from Chuck Bordeau of Spartech Plastics to Mike Shimanski of Rexam, regarding pricing on black TPO laminate, Aug. 21, 1996.
Rexam Custom purchasing requisition, Sep. 9, 1996.
Correspondence from Chuck Bordeau of Spartech Plastics to Mike Shimanski of Rexam, regarding price quotes for lamination, Sep. 17,1996.
Rexam Custom purchasing requisition, Sep. 6, 1996.
Miscellenaeous documentation, (date unknown).
Facsimile correspondence from Mike Shimanski of Rexam to Tom Short, regarding invoicing, Nov. 27, 1996.
Correspondence from Mike Shimanski of Rexam to Tom Short, regarding invoicing, Nov. 27, 1996.
Correspondence from Keith Messerang of Android Industries to Tom Ellison of Rexam, regarding telephone conference, Dec. 6, 1996.
Sales slip to Mr. Howard Cox, Sep. 17, 1997.
Thermoforming Project Timing for Corvette Front License Plate Cover, Jan. 15, 1998.
Document regarding Extrusion Run #11 at Loose Plastics, of Beaverton, MI, Jun. 17, 1998.
Document regarding dry paint films from Rexam, (date unknown).
Email correspondence from John H. Cupstid to Bill R. Steele, regarding Android, GM Research, GM Mid-Lux, etc, Jul. 9, 1998.
Facsimile Correspondence from Mike Shimanski of Rexam to Tom Short of GM, regarding the ISF 2000, Aug. 11, 1998.
Correspondence from Mike Shimanski of Rexam to Tom Short of GM, regarding the ISF 2000, Aug. 11,1998.
Telephone Conversation Memo between Jerry Grybowski and Ken Helper, regarding UG Black Flourex for thermoforming, Jul. 11, 1991.
Interoffice Memorandum from Robert Winton of Rexham Decorative, regarding Meeting Dow, Triangle, Rexham at Lancaster, SC, Jun. 18, 1992.
Business Card from Jerry E. Grybowski of Dow and Kenny Hepler of Triangle Plastics, (date unknown).

Meeting notes between Dow Chemical and Triangle Plastics and Rexam Decorative, Lancaster, SC, Jun. 18, 1992.

Facsimile correspondence from John Blum to Tom Elliason; Mike Shimanski, regarding film testing, Nov. 12, 1992.

Documents regarding Paint Performance on Exterior Plastic Parts, Oct. 27, 1989.

Inter-office memorandum from Tom Ellison of Rexam to Triangle Plastics File, regarding Teleconference with Kenny Helpler, Apr. 14, 1993.

Inter-office memorandum from Tom Ellison, of Rexam to Triangle Plastics File, regarding teleconference with Kenny Hepler, Apr. 29, 1993.

Document regarding Agricultural Manufactures, (date unknown).

Sales Order Form, Nov. 22, 1996.

Sales Order Form, Nov. 12, 1996.

Email correspondence from John H. Cupstid to C. Jerry Patton; Ken W. Dick; Keith O. Wilbourn; Noreen R. Reagan, regarding Textron questions, Feb. 15, 1998.

Email correspondence from John H. Cupstid to Larry W. Snyder, regarding sample materials, Jan. 14,1999.

Email correspondence from John H. Cupstid to Kathy Batdorf, et al, regarding Dorrie International, Jan. 14, 1999.

Email correspondence from John H. Cupstid to Bill R. Steele; C. Jerry Patton, regarding thoughts on Peninsula: use of body color TPO+Fluorex, Jul. 29, 1999.

Email correspondence from john H. Cupstid to sstarbuck@primexplastics.com; Kathy Batdorf; Kim M. Benefield; C. Jerry Patton; Bill R. Steele, regarding material for Paint Film/Thick ABS extrusion trial.

Email correspondence from Kathy Batdorf to John H. Cupstid; Bill R. Steele, regarding Textron, Oct. 1, 1999.

Email correspondence from John H. Cupstid to sstarbuck@primexplastics.com, regarding thcik ABS laminate, Nov. 30, 1999.

Email correspondence from Kathy Batdorf to John R. Cupstid; Bill Re. Steele, regarding Textron request, Dec. 10, 1999.

Email correspondence from Kathy Batdorf to John H. Cupstid, regarding Textron thick sheet, Mar. 20, 2000.

Email correspondence from Kathy Batdorf to John H. Cupstid, regarding Textron thick sheet, Mar. 20, 2000.

Email correspondence from John H. Cupstid to ghery@tac.textron.com, regarding question on thick thermoforming, Apr. 24, 2000.

Email correspondence from John H. Cupstid to sstarbuck@primexplastics.com, regarding ABS samples, May 15, 2000.

Email correspondence from Kathy BAtdorf to John H. Cupstid, regarding getting thick TPO sheet for Textron, May 17, 2000.

Email correspondence from Kim M. Benefield to sstarbuck@primexplastics.com; Steve Q. Ferguson; Dianne C. Crot; Mike D. Crot; John H. Cupstid; Jeff J. Bailey;I C. Jerry Patton; Kathy Batdorf, regarding TPO extrusion lamination trial, Jun. 22, 2000.

Email correspondence from John H. Cupstid to sstarbuck@primexplastics.com, regarding Textron trial, Aug. 18, 2000.

Email correspondence from Kathy Batdorf to John H. Cupstid, regarding prodesign, Aug. 22, 2000.

Email correspondence from John H. Cupstid to sstarbuck@primexplastics.com; Kurt_Katterloher@magna.on.ca; Bill R. Steele, regarding thick sheet for Tonneau Cover, Aug. 24, 2000.

Email correspondence from John H. Cupstid to sstarbuck@primexplastics.com, regarding talked with Magna today, Aug. 30, 2000.

Email correspondence from John H. Cupstid to sstarbuck@woodruffcorp.com, regarding thick ABS sheet for Tonnueau Cover, Sep. 19, 2000.

Email correspondence from John H. Cupstid to visionst@gte.net, regarding paint film: thermoforming, Oct. 13, 2000.

Email correspondence from John H. Cupstid to Todd_Deaville@magna.on.ca at RExam, regarding film requirements, Jun. 22, 2001.

Email correspondence from John J. Cupstid to Polybond@gte.net, regarding heavy gauge film, Jun. 22, 2001.

William NG; "SPE Honors Pacesetting Plastics Developments;" Modern Plastics; Jan. 2003; pp. 58-59.

Office Action Mailed Oct. 7, 2009 for U.S Appl. No. 12/168,538.

* cited by examiner

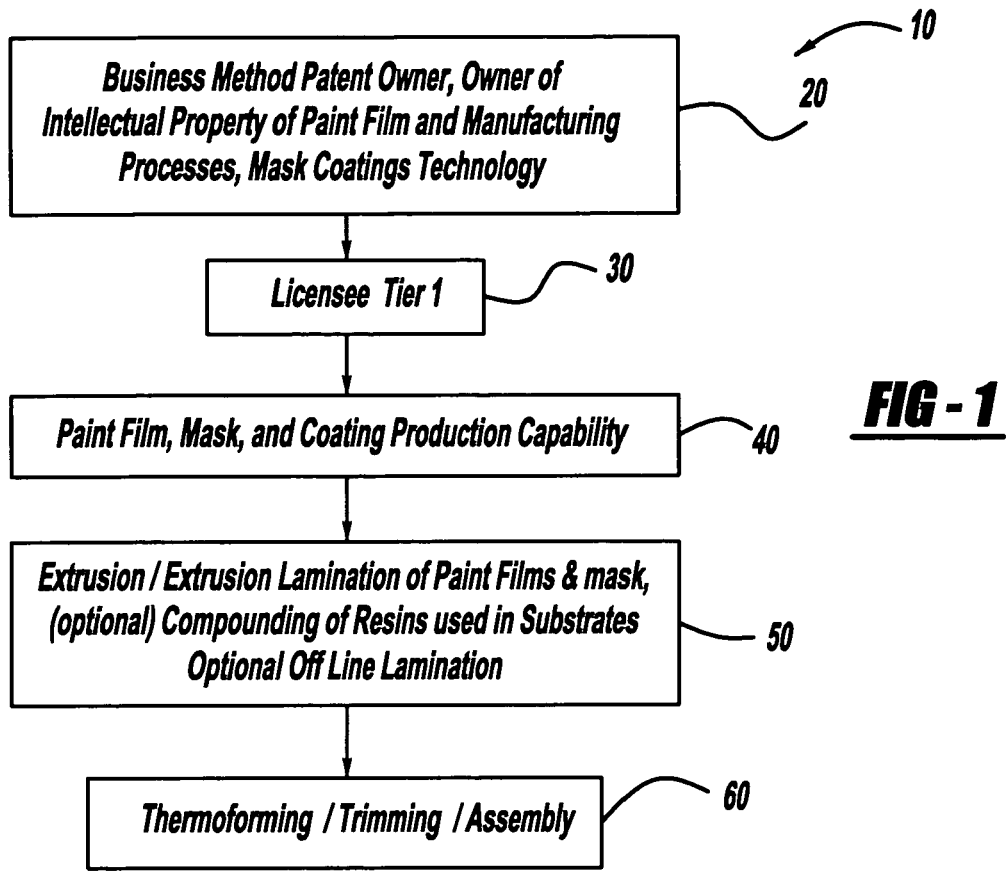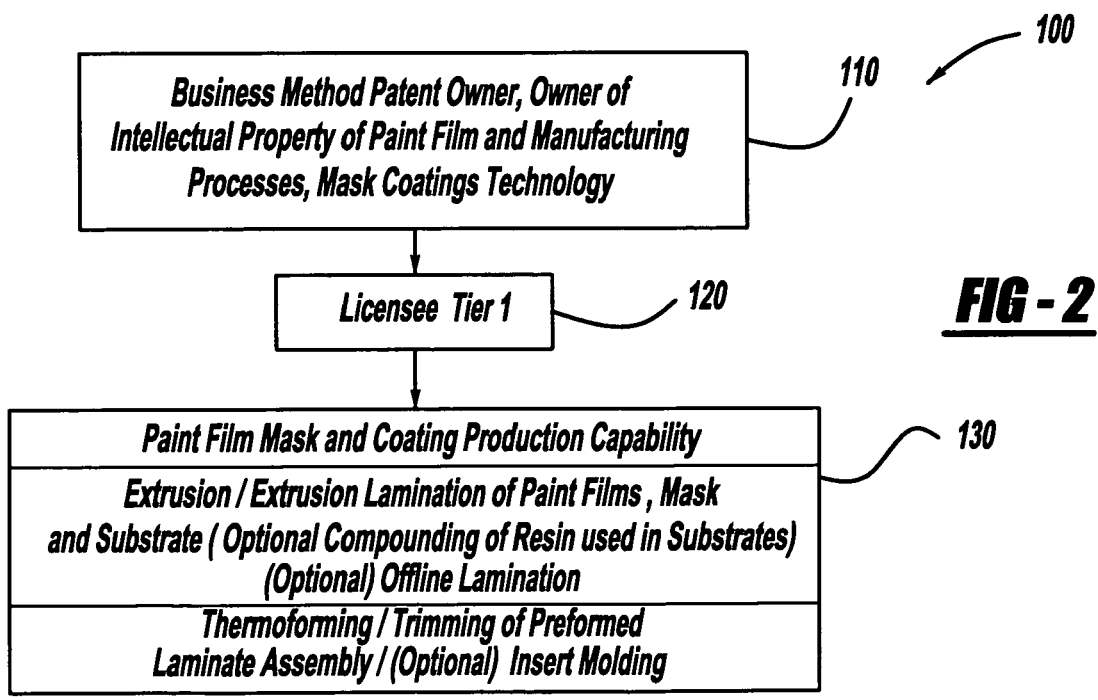

METHOD OF PRODUCING A PAINT FILM PART

CROSS-REFERENCE TO REALTED APPLICATION

The instant application claims priority to U.S. Provisional Patent Application Ser. No. 60/632,729, filed Dec. 2, 2004, the entire specification of which is expressly incorporated herein by reference.

FIELD OF THE INVENTION

The present invention generally relates to thermoforming of plastic articles, and more particularly to new and improved methods for producing decorative laminate composites.

BACKGROUND OF THE INVENTION

In an effort to decrease automobile weight and increase energy efficiency, many automobile manufacturers are employing automobile components that are fabricated from lightweight materials, such as plastic materials (e.g., thermoplastics and thermosets). One such class of plastic materials is generally known as thermoplastic polyolefins (TPO's), such as various grades of polyethylene or polypropylene. Another such class would include ABS and/or ABS/polycarbonate blends.

Some of these components are produced by thermoforming, e.g., vacuum forming, which is generally defined as a process wherein a heated, and thus softened, amount of plastic material (typically in the form of a sheet) is molded into the desired shape through vacuum suction of the warmed plastic onto a pre-formed mold.

Thermoforming can be used for many thicknesses of plastic sheets and can provide great strength in its finished moldings. Fairly complex moldings can be achieved with thermoforming. However, these plastic materials do not typically have a desirable finish (or prematurely lose that finish when exposed to the elements) for use with automotive applications. Furthermore, these plastic materials do not possess sufficient wall thickness. For example, certain conventional automotive components are thermoformed, trimmed and then injection molded.

Various approaches have been taken to providing a high quality automotive paint-like finish to lightweight components, such as molded plastic components. One approach that has received considerable attention uses a surfacing film system having a decorative layer (e.g., a preformed colorant or paint-like film) that can be used to impart a surface effect (e.g., color or other visual pattern) to a thermoformed component. These surfacing film systems are generally referred to as paint or color-containing films. An example of this process can be found in U.S. Pat. No. 5,215,826 to Shimanski et al., the entire specification of which is expressly incorporated herein by reference.

By way of a non-limiting example, paint or color-containing films, especially those used in producing colored automotive components, can be comprised of a decorative layer (e.g., paint, ink, or other colorant), an optional adhesive layer (e.g., a heat-activated adhesive), a preferably scratch resistant optional top clear coat layer, and an optional removable casting base (e.g., a polyester-based sheet). These types of paint or color-containing films are readily commercially available from Avery Dennison Corp. (Pasadena, Calif.), Soliant L.L.C. (Lancaster, S.C.) and Dorrie International (Farmington Hills, Mich.). These paint or color-containing films are generally available in a wide range of colors, including solid metallic colors, and are primarily used in a number of automotive applications.

Additionally, automotive component manufacturers have also used other types of color-containing films, such as mold-in-color (MIC) films. One particular MIC film currently being used is a MIC ionomer film readily commercially available from A. Schulman (Birmingham, Mich.) under the trade name INVISION. The MIC ionomer film typically consists of four discrete layers with a back molded (e.g., injection molded) thermoplastic polyolefin substrate. The layers typically consist of a clear ionomer layer, a colored ionomer layer, an adhesive layer, and a backing layer.

Regardless of the type of paint or color-containing film used, it is sometimes necessary to employ a removable release or masking layer to protect the surface of the component to be thermoformed, due in part to the particular processing parameters encountered during the thermoforming process. This is especially true of thick sheet polyolefin thermoforming. Thick sheet thermoforming typically employs sheets having a thickness in the range of about 0.06 to about 0.5 inches.

Typically, when the thermoforming process is completed, the component is removed from the mold surface and the release layer is then removed. Alternatively, the release layer can be left in place, for example, until the component reaches its final destination, whereupon the release layer can then be removed, thus protecting the outer surface of the component.

An example of decorative laminate composites, and methods for making the same, can be found in commonly assigned U.S. patent application Ser. No. 10/765,427, the entire specification of which is expressly incorporated herein by reference.

Unfortunately, the past history of applications using paint film technology have been somewhat limited in use because of a lack of adequate control of the entire supply chain by one party to manage each production step. As such, conventional paint film technologies have had difficulty being accepted by automotive original equipment manufacturers and Tier 1 suppliers for several reasons.

One reason is that because there are typically numerous separate suppliers and processors within the supply chain of products used to manufacture paint film class A automotive components. Typically, each supplier has a particular expertise limited to specific production steps. As a result, it has been difficult to have each individual supplier take responsibility for scrap loss or component failure when there is a particular quality control issue with either an intermediate or finished component.

When a quality control issue does arise, it usually leads to a breakdown in the relationships among the team of suppliers, as well as the Tier 1 finished component supplier. This breakdown can lead to price increases from the supply chain and difficulties in resolving quality control issues quickly, so that production is not halted due to a lack of material supply.

Accordingly, there exists a need for new and improved methods of producing decorative laminate composites, such as automotive components, including those having paint or color-containing films adhered thereto during the production process.

SUMMARY OF THE INVENTION

In accordance with the general teachings of the present invention, new and improved methods of producing decorative laminate composites are provided.

By way of a non-limiting example, one method of the present invention includes the owner of intellectual property covering the use and manufacture of paint film technology selectively licensing the technology to various automotive component suppliers and manufacturers. The intellectual property can include, without limitation, patents, patent applications, trade secrets, and combinations thereof. Furthermore, the intellectual property can be domestic, international, or foreign in nature.

By way of another non-limiting example, the intellectual property can be licensed to a single supplier that has the capability to completely, or substantially completely, produce the finished component, preferably with a correspondingly high level of quality control. Alternatively, the intellectual property can be licensed to a relatively small number of suppliers if a single supplier is unable to completely produce the finished component. In this manner, the total number of manufacturers and suppliers in the supply chain can be either reduced and/or more carefully controlled, thus leading to increased levels of finished component quality control.

In accordance with a first embodiment of the present invention, a method for producing a decorative laminate composite is provided, comprising: (1) providing a source of intellectual property, wherein the subject matter of the intellectual property is selected from the group consisting of a decorative laminate composite, a method for producing a decorative laminate composite, and combinations thereof; and (2) licensing the intellectual property to at least one supplier, wherein the supplier is operable to produce the decorative laminate composite.

In accordance with a second embodiment of the present invention, a method for producing a decorative laminate composite is provided, comprising: (1) providing a source of intellectual property, wherein the subject matter of the intellectual property is selected from the group consisting of a decorative laminate composite, a method for producing a decorative laminate composite, and combinations thereof; (2) licensing the intellectual property to at least one supplier, wherein the supplier is operable to produce the decorative laminate composite; and (3) forming the decorative laminate composite.

In accordance with a third embodiment of the present invention, a method for producing a decorative laminate composite is provided, comprising: (1) providing a source of intellectual property, wherein the subject matter of the intellectual property is selected from the group consisting of a decorative laminate composite, a method for producing a decorative laminate composite, and combinations thereof, wherein the intellectual property is selected from the group consisting of patents, patent applications, trade secrets, and combinations thereof; (2) licensing the intellectual property to at least one supplier, wherein the supplier is operable to produce the decorative laminate composite; and (3) forming the decorative laminate composite.

A further understanding of the present invention will be had in view of the description of the drawings and detailed description of the invention, when viewed in conjunction with the subjoined claims.

BRIEF DESCRIPTION OF THE DRAWINGS

FIG. 1 is a schematic view of the primary steps in a licensing and production method for producing decorative laminate composites and related automotive components, in accordance with a first embodiment of the present invention; and FIG. 2 is a schematic view of the primary steps in an alternative licensing and production method for producing decorative laminate composites and related automotive components, in accordance with a second embodiment of the present invention.

The same reference numerals refer to the same parts throughout the various Figures.

DETAILED DESCRIPTION OF THE INVENTION

It will be appreciated that the definitions of the following terms and phrases used herein are for illustrative purposes only, and are not meant to be limiting in nature.

By "decorative laminate composite," as that phrase is used herein, it is meant any laminate having at least one color-containing layer associated therewith.

By way of a non-limiting example, the decorative laminate composite preferably includes at least one of the following components, in either abutting or non-abutting relationship to one another:

(a) a support film that is preferably thermoformable, in that it is suitable for use with conventional thermoforming techniques. In accordance with a preferred embodiment of the present invention, the support film is preferably comprised of a polymeric material having a tensile strength greater than 0.5 pli at 300° F., more preferably in the range of greater than 0.5 pli to about 1.6 pli or greater at 300° F., and still more preferably in the range of about 0.75 pli to about 1.0 pli or greater;

(b) a substrate that is preferably thermoformable, such as but not limited to plastic materials, such as thermoplastics, thermosets, and combinations thereof. It should be appreciated that multiple substrate layers may be employed in the practice of the present invention. By way of a non-limiting example, additional substrates, such as but not limited to thermoplastic olefins (TPO), may be adhered to the back surface of the substrate, for example, by way of injection molding. By way of a non-limiting example, the substrate may have a thickness in the range of about 0.0015 inches to about 0.5 inches, and more preferably about 0.06 to about 0.25 inches;

(c) a release film that is preferably thermoformable, in that it is suitable for use with conventional thermoforming techniques. In accordance with a preferred embodiment of the present invention, the release film is preferably comprised of a polymeric material having a tensile strength less than 0.5 pli at 300° F. By way of a non-limiting example, the release film can be comprised of polyurethanes and blends thereof, including water-based urethanes and blends thereof, and the like. By way of a non-limiting example, the release film may have a thickness in the range of about 0.00025 inches to about 0.0005 inches. However, it should be appreciated that release films having a thickness outside of these ranges can be used in the practice of the present invention;

(d) a surfacing film system that is preferably thermoformable, wherein the surfacing film system can be comprised of a decorative layer (e.g., paint, ink, or other colorant), an optional adhesive layer (e.g., a heat-activated adhesive), an optional scratch resistant top clear coat layer, and an optional removable casting base (e.g., a polyester-based sheet). These types of surfacing film systems, also referred to as paint or color-containing films, are readily commercially available from Avery Dennison Corp. (Pasadena, Calif.), Soliant, L.L.C. (Lancaster, S.C.) and Dorrie International (Farmington Hills, Mich.). These films are generally available in a wide range of colors, including solid metallic colors, and are primarily used in a number of automotive applications. It should be appreciated that other types of paint or color-containing films can be used in the practice of the present invention, as well. Additionally, the surfacing film system can be comprised of a mold-in-color (MIC) film. One particular MIC film currently being used is a MIC ionomer film readily commercially available from A. Schulman (Birmingham, Mich.) under the trade name INVISION. The MIC ionomer film typically consists of 4 discrete layers with a back molded thermoplastic polyolefin substrate. The layers typically consist of a clear ionomer layer, a colored ionomer layer, an adhesive layer, and a backing layer; and (e) any other desired material layers such as but not limited to primer layers, adhesive layers, and/or the like.

Thus, any of the aforementioned layers may be employed in the decorative laminate composite of the present invention. Alternatively, it should be appreciated that the decorative laminate composite may be formed with less than all of the aforementioned layers, as well. By way of a non-limiting example, the support film may optionally not be used in forming the decorative laminate composite, e.g., in conjunction with relatively thin sheet thermoforming processes.

By "source of intellectual property," as that phrase is used herein, it is meant any person or entity that is legally authorized to exercise, transfer, or otherwise approve the use of, one or more intellectual property rights. By way of a non-limiting example, the source can be the owner and/or assignee of any patent and/or trade secrets rights.

By "subject matter of the intellectual property," as that phrase is used herein, it is meant to include any intellectual property right concerning the decorative laminate composite, methods for producing the decorative laminate composite, and/or the like.

By "intellectual property," as that phrase is used herein, it is meant any intellectual property medium including but not limited to patents, patent applications, trade secrets, and/or the like.

By "licensing," as that term is used herein, it is meant any medium of authorization, whether in writing or not, permitting a person or entity to practice the subject matter of the intellectual property.

By "supplier," as that term is used herein, it is meant any person or entity that is involved in any phase of the production of the decorative laminate composite.

By "operable," as that term is used herein, it is meant any ability to produce the decorative laminate composite.

By "forming," as that term is used herein, it is meant any process to assemble, shape, modify, or otherwise produce the decorative laminate composite.

In accordance with the general teachings of the present invention, methods for making decorative laminate composites are provided. Without being bound to a specific theory of the operation of the present invention, it is intended that a source or owner of intellectual property concerning the decorative laminate composites and/or methods for making the same authorize a person or entity, such as but not limited to a supplier, to produce the decorative laminate composites in accordance with the rights conferred by the intellectual property.

In accordance with a preferred embodiment of the present invention, a single supplier will be granted the intellectual property rights to produce the decorative laminate composite. The single supplier preferably has the ability to produce the decorative laminate composite, either completely or substantially completely. The supplier is not limited to producing the decorative laminate composite at a single location, and can employ multiple production facilities for producing the decorative laminate composite. In accordance with a preferred embodiment of the present invention, the supplier will be able to completely or substantially completely produce the decorative laminate composite at a single production facility so as to reduce production costs, avoid production delays, and reduce the incidence of damage during product shipment.

If the supplier cannot fully complete the decorative laminate composite, one or more suppliers can be licensed as well in order to aid in the completion of the decorative laminate composite. In accordance with an alternative embodiment of the present invention, the supplier can be authorized to sublicense the intellectual property rights to one or more co-suppliers, either with or without the intellectual property owner's consent.

Furthermore, it should be understood that the intellectual property can be licensed to multiple suppliers, each preferably having the ability to produce the decorative laminate composite, either completely or substantially completely. In this manner, the decorative laminate composite can be produced in multiple locations and by multiple suppliers.

In accordance with a preferred embodiment of the present invention, the supplier is preferably a Tier 1 supplier, that is, a supplier that is capable of producing or substantially producing the finished decorative laminate composite and directly or substantially directly supplies the finished decorative laminate composite to an original equipment manufacturer or the like.

By having a single supplier, or a relatively small number of suppliers, reduction of the supply chain can be achieved. That is, by integration of the production steps of the core components to the Tier 1 supplier, it will allow the Tier 1 supplier to be able to make relatively intelligent and informed decisions and use the best practices and methods of production, especially when considering the quality control of the production steps on each core component.

Referring to FIG. 1, there is shown a flow chart of the primary steps in a licensing and production method for producing decorative laminate composites and related automotive components, in accordance with a first embodiment of the present invention. In this system 10, a thick sheet form and trim process is described.

In the first step 20, the intellectual property related to the decorative laminate composites and methods for making the same will preferably be vested in an owner, assignee, and/or the like.

In the second step 30, the intellectual property rights are licensed, granted, transferred or otherwise made available to a supper, such as but not limited to a Tier 1 supplier.

In the third step 40, the supplier/licensee assembles the requisite production capability (e.g., facilities, equipment, personnel, and/or the like) for producing and/or employing paint films, masking layers, coating layers, substrates, and/or the like.

In the fourth step 50, the supplier executes the requisite production steps necessary to produce, either completely or substantially completely, the decorative laminate composites. This step can include processes such as but not limited to extrusion, lamination, compounding, and/or the like. In the fifth step 60, the supplier executes the necessary steps to form or shape, either completely or substantially completely, the finished decorative laminate composites. This step can include processes such as but not limited to thermoforming, trimming, assembly, and/or the like.

The decorative laminate component can be further processed at this point, or alternatively, used as an automotive component.

Referring to FIG. 2, there is shown a flow chart of the primary steps in an alternative licensing and production method for producing decorative laminate composites and related automotive components, in accordance with a second embodiment of the present invention. In this system 100, an insert injection mold process is described.

In the first step 110, the intellectual property related to the decorative laminate composites and methods for making the same will preferably be vested in an owner, assignee, and/or the like.

In the second step 120, the intellectual property rights are licensed, granted, transferred or otherwise made available to a suppler, such as but not limited to a Tier 1 supplier.

In the third step 130, the supplier/licensee assembles the requisite production capability (e.g., facilities, equipment, personnel, and/or the like) for producing and/or employing paint films, masking layers, coating layers, substrates, and/or the like. The supplier then executes the requisite production steps necessary to produce, either completely or substantially completely, the decorative laminate composites. This can include processes such as but not limited to extrusion, lamination, compounding, and/or the like. Next, the supplier executes the necessary steps to form or shape, either completely or substantially completely, the finished decorative laminate composites. This can include processes such as but not limited to thermoforming, trimming, assembly, and/or the like.

The finished decorative laminate composites can then be subjected to the insert injection mold process wherein a material (e.g., a plastic material) is disposed on a surface (e.g., a back surface) of the finished decorative laminate composites, e.g., to form an automotive component.

Those skilled in the art can now appreciate from the foregoing description that the broad teachings of the present invention can be implemented in a variety of forms. Therefore, while this invention has been described in connection with particular examples thereof, the true scope of the invention should be not so limited, since other modifications will become apparent to the skilled practitioner upon a study of the drawings, specification and following claims.

What is claimed is:

1. A method for producing and commercializing a decorative laminate composite, comprising:
   forming the decorative laminate composite;
   wherein the decorative laminate composite is comprised of:
      a polymeric support film comprised of a material having a tensile strength greater than 0.5 pli at 300° F., wherein the support film is operable to releasably adhere to and support a polymeric substrate during a vacuum thermoforming process;
      a paint or color-containing film system, wherein the paint or color-containing film system includes a clear coat layer disposed on a surface thereof; and
      a polymeric substrate, wherein the polymeric substrate is translucent or opaque, wherein the paint or color-containing film system is disposed between the support film and the polymeric substrate, wherein the polymeric substrate is comprised of a material selected from the group consisting of a thermoplastic polyolefin, ABS, and combinations thereof;
   wherein the support film, polymeric substrate, and paint or color-containing film system are subjected to a vacuum thermoforming process;
   wherein the support film is releasably adhered to the paint or color-containing film system;
   wherein the support film supports the polymeric substrate during the vacuum thermoforming process;
   wherein the clear coat layer is disposed on the surface of the paint or color-containing film system prior to the vacuum thermoforming process;
   providing a source of intellectual property, wherein the subject matter of the intellectual property is selected from the group consisting of a decorative laminate composite, a method for producing a decorative laminate composite, and combinations thereof; and
   licensing the intellectual property to at least one supplier, wherein the supplier is operable to produce the decorative laminate composite.

2. The invention according to claim 1, further comprising the step of forming the decorative laminate composite.

3. The invention according to claim 2, wherein the step of forming the decorative laminate composite includes a thermoforming process.

4. The invention according to claim 2, wherein the step of forming the decorative laminate composite includes an extrusion process.

5. The invention according to claim 1, wherein the decorative laminate composite includes a masking film.

6. The invention according to claim 1, wherein the intellectual property is selected from the group consisting of patents, patent applications, trade secrets, and combinations thereof.

7. The invention according to claim 1, wherein the decorative laminate composite further comprises an ionomeric color-containing film.

8. The invention according to claim 1, wherein the decorative laminate composite is an automotive component.

9. A method for producing and commercializing a decorative laminate composite, comprising:
   providing a source of intellectual property, wherein the subject matter of the intellectual property is selected from the group consisting of a decorative laminate composite, a method for producing a decorative laminate composite, and combinations thereof;
   licensing the intellectual property to at least one supplier, wherein the supplier is operable to produce the decorative laminate composite; and
   forming the decorative laminate composite;
   wherein the decorative laminate composite is comprised of:
      a polymeric support film comprised of a material having a tensile strength greater than 0.5 pli at 300° F., wherein the support film is operable to releasably adhere to and support a polymeric substrate during a vacuum thermoforming process;
      a paint or color-containing film system, wherein the paint or color-containing film system includes a clear coat layer disposed on a surface thereof; and
      a polymeric substrate, wherein the polymeric substrate is translucent or opaque, wherein the paint or color-containing film system is disposed between the support film and the polymeric substrate, wherein the polymeric substrate is comprised of a material selected from the group consisting of a thermoplastic polyolefin, ABS, and combinations thereof;
   wherein the support film, polymeric substrate, and paint or color-containing film system are subjected to a vacuum thermoforming process;
   wherein the support film is releasably adhered to the paint or color-containing film system;
   wherein the support film supports the polymeric substrate during the vacuum thermoforming process;
   wherein the clear coat layer is disposed on the surface of the paint or color-containing film system prior to the vacuum thermoforming process.

10. The invention according to claim 9, wherein the step of forming the decorative laminate composite includes a thermoforming process.

11. The invention according to claim 9, wherein the step of forming the decorative laminate composite includes an extrusion process.

12. The invention according to claim 9, wherein the decorative laminate composite includes a masking film.

13. The invention according to claim 9, wherein the intellectual property is selected from the group consisting of patents, patent applications, trade secrets, and combinations thereof.

14. The invention according to claim 9, wherein the decorative laminate composite further comprises an ionomeric color-containing film.

15. The invention according to claim 9, wherein the decorative laminate composite is an automotive component.

16. A method for producing and commercializing a decorative laminate composite, comprising:
   providing a source of intellectual property, wherein the subject matter of the intellectual property is selected from the group consisting of a decorative laminate composite, a method for producing a decorative laminate composite, and combinations thereof, wherein the intellectual property is selected from the group consisting of patents, patent applications, trade secrets, and combinations thereof;
   licensing the intellectual property to at least one supplier, wherein the supplier is operable to produce the decorative laminate composite; and
   forming the decorative laminate composite;
   wherein the decorative laminate composite is comprised of:
      a polymeric support film comprised of a material having a tensile strength greater than 0.5 pli at 300° F., wherein the support film is operable to releasably adhere to and support a polymeric substrate during a vacuum thermoforming process;
      a paint or color-containing film system, wherein the paint or color-containing film system includes a clear coat layer disposed on a surface thereof; and
      a polymeric substrate, wherein the polymeric substrate is translucent or opaque, wherein the paint or color-containing film system is disposed between the support film and the polymeric substrate, wherein the polymeric substrate is comprised of a material selected from the group consisting of a thermoplastic polyolefin, ABS, and combinations thereof;
   wherein the support film, polymeric substrate, and paint or color-containing film system are subjected to a vacuum thermoforming process;
   wherein the support film is releasably adhered to the paint or color-containing film system;
   wherein the support film supports the polymeric substrate during the vacuum thermoforming process;
   wherein the clear coat layer is disposed on the surface of the paint or color-containing film system prior to the vacuum thermoforming process.

17. The invention according to claim 16, wherein the step of forming the decorative laminate composite includes a thermoforming process.

18. The invention according to claim 16, wherein the step of forming the decorative laminate composite includes an extrusion process.

19. The invention according to claim 16, wherein the decorative laminate composite includes a masking film.

20. The invention according to claim 16, wherein the decorative laminate composite further comprises an ionomeric color-containing film.

21. The invention according to claim 16, wherein the decorative laminate composite is an automotive component.

* * * * *